April 14, 1959 R. J. LOWRIE 2,881,762

SURGICAL STAPLE AND STAPLER

Filed Feb. 9, 1955 3 Sheets-Sheet 1

Robert J. Lowrie Inventor

By Richard H. Nagel Attorney

April 14, 1959 R. J. LOWRIE 2,881,762

SURGICAL STAPLE AND STAPLER

Filed Feb. 9, 1955 3 Sheets-Sheet 2

Robert J. Lowrie Inventor

By Richard H. Nagel Attorney

April 14, 1959 R. J. LOWRIE 2,881,762

SURGICAL STAPLE AND STAPLER

Filed Feb. 9, 1955 3 Sheets-Sheet 3

Robert J. Lowrie Inventor

By Richard W. Nagel Attorney

United States Patent Office 2,881,762
Patented Apr. 14, 1959

2,881,762

SURGICAL STAPLE AND STAPLER

Robert J. Lowrie, New York, N.Y.

Application February 9, 1955, Serial No. 487,011
9 Claims. (Cl. 128—337)

The present invention relates to staples and more particularly to a novel surgical staple for approximating tissues and means for applying the staple.

Wounds and tissues are presently approximated by two general methods, namely by suture or ligature, and by clips. Both of these methods suffer from certain disadvantages. The operation involving use of suture-ligature, or ligature alone, is time-consuming and wasteful Only about one-tenth of the suture material employed is actually a part of the knot; the balance must be discarded. Furthermore, the number of steps involved in applying a suture or ligature, such as threading the needle, putting this in the needle holder, piercing the tissue, removing the needle holder from the eye-end of the needle, catching point-end, drawing needle out of tissue, removal of needle holder, tying the long ends of the suture together to get the knot which secures the loop compressing the enclosed tissue and finally cutting the long portions close to the knot, detract from the efficiency and rapidity of this method of tissue apposition.

Also, a more rapid method of approximation now in vogue is the use of clips. These are generally made of metal, in the form of a saddle or an inverted V. At each end at an angle to the body of the skin clip there is a tooth. The clip is closed by arching it over the tissues which are pierced by the teeth which, however, do not make contact with each other. Skin clips are removed later. However, the arms of the V-shaped clip, used almost solely in neurosurgery, are pressed together over superficial bleeding points only, and are left in the tissue. In bone surgery, also, there is now used a non-locking staple similar to that employed by the carpenter.

The use of clips or the bone staple has the disadvantage in that the clip cannot lock, and thus its security depends solely on the rigidity of the metal. Furthermore, the skin clip is limited only to use in the skin and is not suitable for hemostasis. It must be removed in the post-operative period.

It is, therefore, the principal object of the present invention to provide a means and method for approximating tissue which is more rapid, more secure and which may be accomplished with greater facility and economy than is possible by use of sutures, clips and bone staples described above.

A further object of the present invention is to provide a locking, surgical staple offering maximum security, the security of which is not dependent on the rigidity of the arch, as in clips, but mainly by a locking technique as disclosed more clearly below.

A A still further object of the present invention is to provide a stapling apparatus, or stapler, for applying to the tissue the staple of the present invention.

Other objects, advantages and results of the present invention will appear in the course of the following specification.

The objects of the present invention may be realized through the provision of a locking staple which is basically a ring of the necessary rigidity which, when open, presents two ends. When these ends pierce the tissue, overlap and lock, the tissue within the closed ring is compressed just as it would be if the suture, needle and "knot" were used.

The ends of the staple lock by virtue of the "tongue and groove" mechanism. After insertion in the tissue, the enlarged ends of the "tongues" of one end of the open staple are forced into and are caught within the "grooves" of the other end of the staple. The security offered by the tongue and groove mechanism of the surgical staple of the present invention is greater than that given by the knot of the suture or by the various modifications of clips or bone staples now in use.

Insertion of the surgical staple with the high precision required is performed by the stapler of the present invention. This device holds the open staple rigidly within its jaws, pierces a pathway in the tissue for passage of each limb of the staple so that, on further manipulation of the stapler, the limbs meet, overlap, and lock. As shown more clearly in the description below, in a preferred embodiment the stapler records the amount of overlapping of the limbs of the staple, which in turn gives the size of the "island" of tissue compressed. With this information the surgeon can be made aware of the degree of "tightness" needed.

The invention will appear more clearly from the following detailed description when taken in connection with the accompanying drawings showing by way of example preferred embodiment of the invention.

Figure 1:
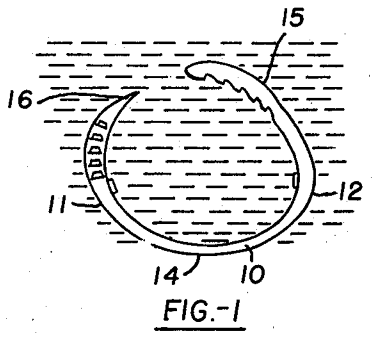
Figures 1 and 2 are side views of the surgical staple, in the tissues, in open and closed positions respectively.
Figure 2:
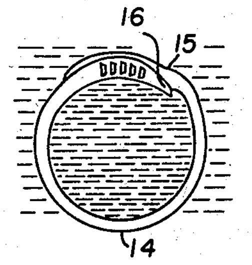

Turning first to the staple, this is basically a ring. As detailed, Figures 1 and 2 show the staple 10 in open and closed position respectively. If the pointed ends 15 and 16 of the open limbs 11 and 12 respectively pierce the tissue and the limbs then pressed medially, the staple may be made to lock. The closed or locked staple may be a little flatter than when open. Also, the "island" of tissue in the closed staple (Fig. 2) is somewhat denser, due to compression, than is the tissue outside. Arch 14 of the staple preferably is the narrowest and most flexible part thereof. The tissue within the locked staple (Fig. 2) is compressed either for hemostasis or, primarily, for union of surfaces.

The tongue and groove mechanism by which the staple is locked is shown in the locked position in Figure 2. In Figure 1, tongue-end 15 and groove-end 16 are shown in the open position.

Figure 3:
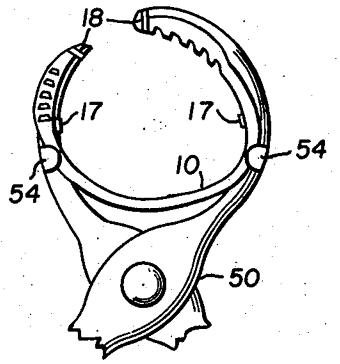
Figure 3 is a side view of the surgical staple positioned on the stapler.
Figure 4:
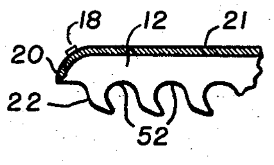
Figures 4 and 5 are respectively a longitudinal and a cross-section of the right or covering limb and corresponding jaw of staple and stapler respectively.

Figure 3 shows the staple held rigidly within the jaws of stapler 50. The points of the staple are approaching each other but have not made contact. As detailed at length below, the staple may be made of a variety of non-rigid, semi-rigid or rigid materials. When a non-rigid material, such as cat gut, is employed as the staple-forming substance, the staple must, during insertion, be "splinted" by the stapler. Also, since the points of the open staple need not of necessity be hard enough to pierce the tissue, this may be performed by the pointed advancing jaw of stapler 50 to which the point of the staple is attached by band 18. The latter is the band or portion of staple 10 close to the points of the staple into which spear points 20 (Figure 14) of stapler 50 fit.

When the arms of the stapler are compressed, the jaws of the stapler press medially so as to close the staple. During this closing, buckling of the staple out of the plane of the jaws of the stapler is prevented by the middle ear 17, which is on the undersurface of and is part of the staple. This engages the arm of the stapler and thus prevents buckling. The more the jaw is pressed against the limbs 11 and 12 of the staple the greater the tendency of the middle ear to be caught around the jaw.

The proximal ear 54 also helps to prevent buckling of the staple. Ear 54 is part of stapler 50. It "hooks" over staple 10 and allows it to slide downward and inward during closure, i.e. as side to side diameter decreases with increase of the diameter at right angle to this but always in the plane of the jaws of the stapler.

The elements of the "tongue" of the tongue and groove mechanism are shown in Figures 4–7. Band 18 is part of the staple, and may be a ring or loop or pocket adapted to hold the point of the limb of the staple tightly against the jaw of the stapler. It is located in close proximity to the spear point 20 of each jaw of stapler 50.

Figure 7:
Figure 12:
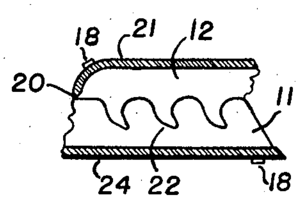
Figures 12 and 13 are, respectively, longitudinal and cross-section views of the locked staples within their corresponding jaws.
Figure 13:
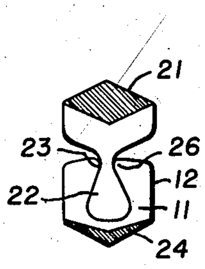

Three tongues 22 only are shown, though several may be present. The tongues slant backward, have concave rear surfaces, and each resembles the larger surface of a flattened, hemisected pear, as indicated in the rear view (Figure 7). The narrow bulging front surface is to be noted. Figure 7 shows a rear view of the tongue with its concave rear surface. The lips at the sides are adapted to fit in front of and against the "strictures" in the groove (Figs. 12 and 13).

The web or skirt 52 of the staple is of variable depth, depending upon the rigidity of the stapler. It is adapted to keep the tongues in line as they are dragged forward in the tissue cut by spear point 20.

Figure 5:
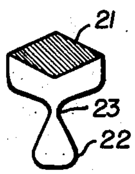
Figure 6:
Figures 6 and 7 are respectively side and rear views of the "tongue;"

Figure 5 shows in cross-section the right or covering limb 12 of staple and covering jaw 21 of stapler 50.

Figure 8:
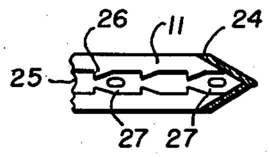
Figures 8–9 show respectively the superior and inferior surfaces of the left or receiving limb of the staple and its jaw of the stapler.
Figure 9:
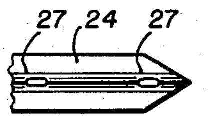
Figure 10:
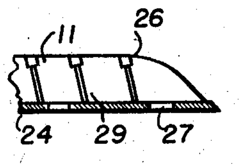
Figures 10 and 11 are respectively longitudinal and cross-sectional views of the left or receiving limb of the staple and its jaw of the stapler.
Figure 11:
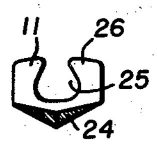

Turning now to the left or receiving limb of the staple, this carries the groove mechanism and, in Figures 8–11, it is shown in its contact relation with the jaws of the stapler on the inferior and superior surfaces, as well as the relationship in sagittal section (Fig. 10) and cross section (Fig. 11). In Figure 8 there is a view of the superior surface of the left or receiving limb showing the left or receiving jaw 24, the groove 25, the shoulders 26 and the vents 27 in the groove 25. The groove in the receiving limb is adapted so that the tongues of the covering limb slide therein.

The corresponding inferior surface of the left or receiving limb is shown in Figure 9. The surface is covered by the left or receiving jaw 24 of the stapler.

A sagittal section of the left or receiving limb 11 of the staple attached to left or receiving jaw 24 of stapler is presented in Figure 10. The slanting strictures 29 may be seen, with their upper limits in the form of shoulders 26. These shoulders are medial projections and are the upper and outer parts of each side of the ring-like constrictions or strictures which divide the groove equally into the same number of sections as there are tongues. The pairs of shoulders "give" laterally to allow the tongues to pass between them. The rear surface of the tongue is a little wider than the distance between the shoulders. When the tongue passes, the shoulders spring back medially behind the lateral edges of the posterior (concave) surface of the tongue. As seen, then, the tongues—and hence the covering limb—can not recede.

Vents 27 are exists in the floor of the grooves to permit escape of any material dragged in with the tongues.

In Figure 11 there is shown a cross-sectional view of the left or receiving limb 11 of the staple attached to left jaw of the stapler. Groove 25 in the locked staple holds the tongues of the right limb of the staple against shoulder 26.

The meshed and locked staple is shown in sagittal section (Figure 12) and in cross section (Figure 13). In these figures there is seen how the tongue-limb meshes with and is locked into the groove-limb. In Figure 12 spear point 20, the point of the jaw 21 of the stapler which burrows through the tissue has pierced the tissue, and each tongue 22 has squeezed past the strictures 29 and shoulders 26 as these "spring" somewhat and then spring back to be behind and against the posterior surfaces of the tongues. Strictures 29 are ring-like elevations in the groove against which the posterior surface of the tongue rests to prevent the tongue from going backward. The tongue-limb (covering limb), therefore, cannot go backward in the groove. The tongues are all in the same phase since the strictures and tongues are the same distance apart.

In Figure 13 there is seen a cross section of the locked staple through the middle tongue of Figure 12. Shown are the relationships to the jaws and of the one limb to the other. It is to be observed that, because of the narrow neck 23 of the tongue, the tongue cannot get "up" out of the groove; nor (see above) can it come "back." It can go only forward.

Considering now the stapler 50 (Fig. 14), the general form thereof is that of a modified surgical instrument adapted to make it suitable for engaging and setting the novel staple. The surgical stapler somewhat resembles, and is applied like, a skin hook or a cervical tenaculum, the opening and closing of the jaws on the staple being controlled by the ratchet 56 which may be operated by button 58. The ratchet mechanism combines a dog 60 and a fixed bar 65. To open the stapler, dog 60 must not be in contact with bar 65. This removal of dog from fixed bar is provided by pressing button 58. To close the stapler, arms 55 and 57 are compressed, and dog 60 "bumps" along bar 65.

Spring 69 has one end (66) fixed to the inside of one arm of the stapler, and the other end 67 free to glide on the inside of the opposite arm. The spring tends to keep the stapler open with arms separated. The stapler is closed by compressing the arms, against the resistance of the spring (69).

A smaller spring 64 serves to keep dog 60 "hooked" into fixed bar 65 until release is given by pressure on button 58. The Z-shaped lever 61 which serves to transmit the motion exerted by pressure on the "button" or outside end 58 thereof to dog 60 is allowed to move freely in opening 63 in the arm 55 of the stapler, and rotates about pivot 62. This lever controls dog 60 which, when in contact with fixed bar 65, holds the arms of the stapler separated in any fixed position. For this purpose, one side of the bar is saw-toothed to allow engagement of dog 60. Spring 64 always keeps dog 60 engaged with the teeth of 65 until release is given by pressure on button 58. This spring is fixed to the inside of one arm; but along the vertical portion of lever 61 just proximal to pivot 62 it may, if necessary, glide.

The distance between the jaws is measured by gauge 68. Adjustment thereof indicates immediately the relationship of the limbs of the staple to each other. The degree of closure, and the size of the island of tissue within the staple are therefore always known. Too—as a double check—the "jolts" made as the tongue squeezes past each stricture of the groove can be "felt" by the hand on the arms of the instrument.

Figure 17:
Figure 17 is a cross-sectional view of the left or receiving jaw.
Figure 16:
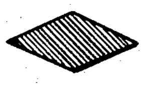
Figure 16 is a cross-sectional view of the right or covering jaw.
Figure 15:
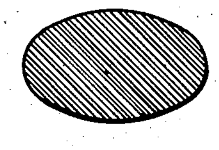
Figure 15 is a cross-section of the stapler arm at about the mid section.

Figures 15, 16, and 17 are cross-sectional views respectively of (*a*) the arm at about the middle, (*b*) the right or covering jaw at about the middle and (*c*) the left or receiving jaw.

It is essential that the points of the jaws pass each other with an error of distance relationship of not more than about half a millimeter. This accuracy is attained by making the intersecting surfaces of the arms as large as possible in relation to the shortness of the jaws. Also, the hardness of the jaw, a cross section which gives maximum strength, maximum sharpness of curvature, and its tapering to a smaller diameter all contribute to give the necessary rigidity for accurate apposition.

Figure 18:
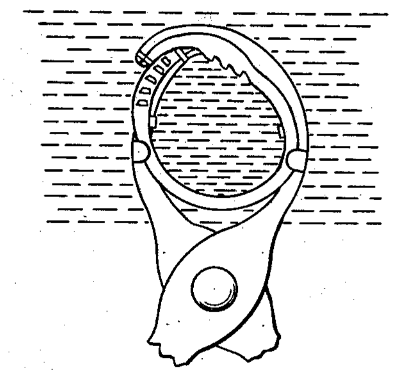
Figure 18 is a side view of the staple inserted in tissue and partly closed.

Figure 18 is a diagrammatic representation of the staple inserted in tissue by the stapler, and partly closed. The jaws of the stapler when in wide open position and the staple rigidly attached are "hooked" into the tissue in much the same way as the surgeon would apply a skin hook. Two of the five "tongues" of the right or covering limb are shown in the groove of the left or receiving limb. The tissue within the staple is somewhat denser than that outside it because of the beginning compression.

Figure 14:
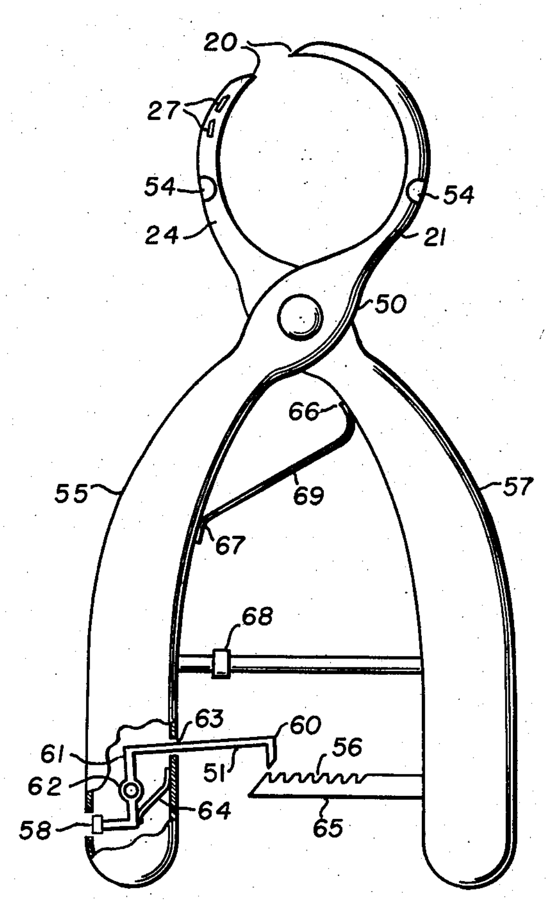
Figure 14 is a side view of the surgical stapler.
Figure 19:
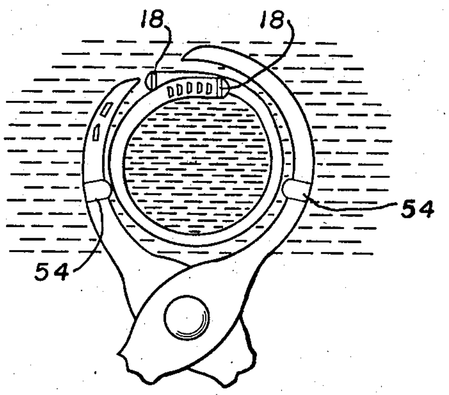
Figure 19 is a side view of the locked staple from which the stapler has just been released but still in tissue.

In Figure 19, the staple has been locked in the tissue, the stapler released from the staple, but is still in the tissue. Having inserted the staple to the desired degree of tightness, the stapler is released by pressing button 58 (Fig. 14). Each point of the jaw comes out of its own band 18: each proximal ear 54 comes away and pressure of the jaw is no longer against each middle ear 17 (not shown). Removal of the staple from tissue thereafter is similar to removing a skin hook from the skin.

In the completely closed, or locked, position the staple may be flattened, from side to side rather than circular as shown, and the tissue within it is denser than that outside, due to compression; the compression may be either for hemostasis or for approximation.

Figure 20:
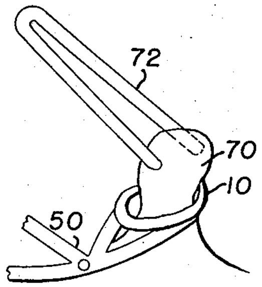
Figure 20 is a superior view of a modification of the stapler with angulated arms. The arms of the stapler may be either straight (Fig. 14) or angulated (Fig. 20).
Figure 21:
Figure 21 is a superior view showing the suppression of bleeding in a bleeding point by means of the staple.

The use of the staple of the present invention in a typical abdominal operation may, for example, be described in connection with a hysterectomy. When the skin and fat layers of the abdominal wall are opened, blood oozes from several bleeding points which must be shut off by hemostasis. These points are, one by one, constricted by use of the staple so that the operative field is now "dry" (Figures 20 and 21). The fascia and peritoneum are entered next and the pelvic viscera are now exposed. The uterus is removed after severing the ligaments and structures holding it, and then cutting it loose from the vaginal vault. Thus, when two staples are inserted near each other on one of the ligaments and the ligament cut between these staples, this ligament no longer holds the uterus. Furthermore, since the staples are close to the cut ends of the ligaments they have effected hemostasis. Note how the staple has replaced the suture-ligature or ligature in current usage.

The raw edges or surfaces of the anterior and posterior vaginal walls are approximated by staples applied as shown in Figures 18 and 19, employing surface stapling just as in the case of closure of the fascia above. The stumps of ligaments are united in the midline by staples, thus "suspending" the vaginal vault. Hemostasis is performed as needed using a stapler with angulated handles (Figure 20).

To close the abdominal wall, the cut edges of the peritoneum and fascia are united in the midline by surface stapling (Figure 22), after which the skin and fat may be united by subsurface staples.

In one of its embodiments, the stapler is provided with angulated arms. This is particularly adapted to stapling in the lower regions of a deep cavity, and also in hemostasis where the plane of the staple would be in a plane parallel to the bleeding surface, i.e. at right angles to the "cone" of tissue being constricted (Figure 20). Here the bleeding point 70 has been grapsed by thumb forceps 72 held in the left hand while stapler 50 in the right hand applies the staple 10 to the "cone" of tissue adjacent to the vessel-bearing tissue. When the staple is locked tightly on the cone, the bleeding is controlled by compression of the local area. With this point controlled, the next bleeding point is grasped with thumb forceps and the procedure repeated. The stapler has thus replaced the ligature which otherwise would have been tied about the cone. Thus in Figure 21 is shown the bleeding point suppressed. Staple 10 permanently constricts the cone and thus prevents further passage of blood from the vessel-bearing area.

With hemostasis by stapling, the surgeon does not need an assistant. With one hand he grasps the bleeding point while with the other he applies the hemostatic staple. On the other hand, in hemostasis with suture, an assistant is needed to seize the point with the hemostatic forceps and also assist in applying the suture, knotting, cutting suture and removal of the hemostat. With stapling, on the other hand, no scissors or clamps are needed, and it may be performed much more quickly and cheaply than by suture.

Figure 22:
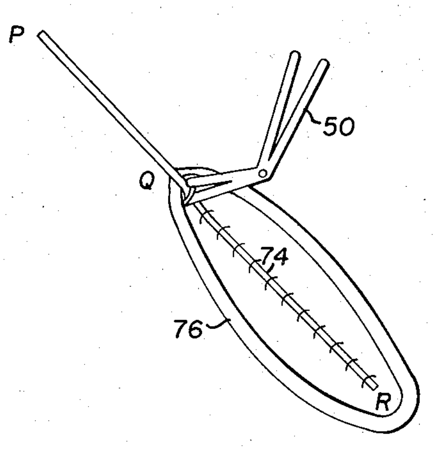
In Figure 22 there is shown use of the staple for approximating surfaces or edges of tissue primarily for continuity, as in closure of layers of the abdominal walls.

In Figure 22 there is illustrated the use of the staple for approximating surfaces or edges of tissue primarily for continuity, as in closure of layers of the abdominal walls. Surface stapling and subsurface stapling are shown. In the abdominal incision, denominated PR in the figure, the fascial layer 74 has been closed, the portion under PQ not being shown, by piercing the tissue edges with staples. The exposed portions of these closed staples are seen. This is surface stapling. The raw edge of fat and skin layer of the abdominal wall is designated 76.

The portion of the abdominal incision wherein the skin edges have been approximated by subsurface stapling is designated PQ (Fig. 22). Staple 10 (in jaws) is shown in the process of insertion by stapler 50, thus closing the skin edges by approximating the raw surfaces of the tissue beneath the skin. This subsurface stapling replaces the subcuticular stitch now in current use. With each staple so placed the line of skin closure PQ will finally be extended to become PR. No staples will be visible in the finally completed line of closure.

In subsurface closure by staples, there are many important advantages over suturing. It is more cheaply, easily, and quickly performed, and the patient does not have to wait extra days in the hospital for suture removal. Furthermore, where the subsurface line of union is in contact with other structures inside the body, there being no rough surface from reaction of the suture line, there is little likelihood of adhesive formation.

Unlike the clip or bone staple now in current use, the staple of the invention locks and thus offers maximum security. It may be made from either absorbable material, such as catgut and protein-derived materials, or non-absorbable materials such as plastic, nylon, or metals such as tantalum. Other sources from which the staple may be prepared are animal hide, cartilage and hooves of very young animals, bills and claws of new born fowl, rubber, polyethylene, and various metals.

Stapling instead of suturing or using clips is characterized by economy, facility, speed and simplicity. Eliminated in tissue approximation are the suture needle, needle holder, scissors and hemostatic clamps. It may be performed with less assisting personnel, more easily, and in about half the time required for suturing. The latter presently takes up most of the time of operation. Stapling cuts this time in half. The cost of materials for stapling—the staples and staplers, which may be in one or more sizes, is much less than the cost of suturing methods. Patient-stay in hospital is less, and the total costs of medical care are greatly reduced.

What is claimed is:

1. A surgical clip, comprising a substantially arcuately formed and deformable unitary body including spaced, opposed interlocking end portions, at least one of said end portions being pointed and adapted to penetrate, wherein a first end portion substantially affords a detention groove ratchet section and the other and second end portion affords a pawl-toothed, tongue section, said tongue section being insertable in said groove section to be retained therein against radial, and arcuately reversible displacement.

2. A surgical clip according to claim 1, wherein said first end portion defines a peripheral groove of substantially bulbous cross section opening radially outward at the narrower end, and including a series of oppositely faced, longitudinally spaced ratchet teeth defined by the side walls of said peripheral groove.

3. A surgical clip according to claim 1, wherein said second end portion defines a tongue of substantially bulbous cross section extended radially inward from the periphery of said portion with the wider edge of said tongue faced inwardly, and including a series of pawl teeth disposed in spaced relation longitudinally of each side surface of said tongue and in paired alignment laterally thereof.

4. A surgical clip, comprising a substantially arcuately formed and deformable unitary body including opposite, opposable and arcuately overriding end portions, at least one of said end portions being pointed and adapted to penetrate, and interlocking engaging means defined peripherally of one end portion and inwardly of said other end portion adapted to resist radial and arcuately reversible displacement.

5. A clip according to claim 4 wherein said end portions are initially disposed in arcuately spaced relation, and wherein said body portion is preferentially weakened at a point therein which is in substantially diametric opposition to a point intermediate said spaced end portions.

6. A surgical clip according to claim 1 wherein said detention groove, ratchet section defines a series of apertured vents disposed in spaced relation longitudinally of said detention groove, ratchet section.

7. A surgical clip applicator, comprising a scissor-like assembly including two arms pivotally joined at a point intermediate the ends of each which is eccentric of their length and which point defines a common and innermost limit of a pair of elongated, opposed manipulation handles and a pair of shorter, arcuate jaws disposed in opposed, substantially co-planar alignment for overlapping peripheral approximation with the inner peripheral edge of a first jaw in said pair extensible over the outer peripheral edge of the second jaw in said pair into closely spaced radial relationship thereto, a tissue perforating terminal end on each jaw, a clip receiving grooved portion defined in the inner peripheral edge of said first jaw, a clip receiving grooved portion defined in the outer peripheral edge of said second jaw, each of said grooved portions extending from an entrance at the terminal end of one of said jaws to an outlet opening through a sidewall thereof on the corresponding side surfaces of said jaws, and at least one ear portion on each of said jaws extended radially inward from the outer peripheral edge portion of each jaw over and in spaced relation to said corresponding sidewall jaw surfaces intermediate said grooved portion outlets and said pivot point, each of said ear portions with one of said jaw surfaces defining a clip receiving notch.

8. An applicator according to claim 7 wherein the bottom wall of said grooved portion in said second jaw defines a series of tissue vent apertures disposed in spaced relation longitudinally thereof.

9. In combination, a surgical clip applicator with a surgical clip, said applicator comprising a scissor-like assembly including two arms pivotally joined at a point intermediate the ends of each which is eccentric of their length and which point defines a common and innermost limit of a pair of elongated, opposed handles and a pair of shorter, arcuate jaws disposed in opposed, substantially co-planar alignment for overlapping peripheral approximation with the inner peripheral edge of a first jaw in said pair extensible over the outer peripheral edge of the second jaw in said pair into closely spaced relationship thereto, a tissue perforating terminal end on each jaw, a clip receiving grooved portion defined in the inner peripheral edge of said first jaw, a clip receiving grooved portion defined in the outer peripheral edge of said second jaw, each of said grooved portions extending from an entrance at the terminal end of one of said jaws to an outlet opening through a side wall thereof on the corresponding surfaces of said jaws, ear portions on each of said jaws extended radially inward from the outer peripheral end portion of each jaw over and in spaced relation to said corresponding side wall jaw surfaces intermediate said grooved portion outlets and said pivot point, each of said ear portions with one of said jaw surfaces defining a clip receiving notch, said clip comprising a substantially arcuately formed and deformable body provided with interlocking engaging means defined peripherally of one end portion and inwardly of another end portion adapted to resist radial and arcuately reversible displacement, said ear portions adapted to engage said clip.

References Cited in the file of this patent

UNITED STATES PATENTS

| | | |
|---|---|---|
| 130,853 | Hill | Aug. 27, 1872 |
| 715,612 | Van Schott | Dec. 9, 1902 |
| 1,066,025 | Lieberknecht | July 1, 1913 |
| 1,136,149 | McGowan | Apr. 20, 1915 |
| 1,804,725 | Walker | May 12, 1931 |
| 2,232,142 | Schumann | Feb. 18, 1941 |
| 2,254,620 | Miller | Sept. 2, 1941 |
| 2,434,831 | Brandenburg | Jan. 20, 1948 |
| 2,635,238 | Garland | Apr. 21, 1953 |

FOREIGN PATENTS

| | | |
|---|---|---|
| 78,095 | Germany | Nov. 17, 1894 |
| 142,974 | Germany | July 31, 1903 |
| 464,802 | Italy | July 23, 1951 |
| 913,464 | Germany | June 14, 1954 |